[22.]

JAMES R. BAIRD.

Improvement in Wheels for Vehicles.

No. 4,567. Reissued Sep. 26, 1871.

Witnesses:
Henry A. Miller
C. L. Ewert.

Inventor
James R. Baird
per Alexander Mason
Attorneys.

AM. PHOTO-LITHOGRAPHIC CO. N.Y. (OSBORNE'S PROCESS.)

UNITED STATES PATENT OFFICE.

JAMES R. BAIRD, OF VINCENNES, INDIANA.

IMPROVEMENT IN WHEELS FOR VEHICLES.

Specification forming part of Letters Patent No. 117,142, dated July 18, 1871; reissue No. 4,567, dated September 26, 1871.

*To all whom it may concern:*

Be it known that I, JAMES R. BAIRD, of Vincennes, in the county of Knox and in the State of Indiana, have invented certain new and useful Improvements in Wheels for Vehicles; and do hereby declare the following to be a full, clear, and exact description thereof, reference being had to the accompanying drawing and to the letters of reference marked thereon.

My present invention is intended as an improvement upon the wheel for vehicles for which Letters Patent were granted to me March 8, 1870; and it consists in a wheel composed of a wooden hub surrounded with a metallic ring, staggered spokes, having shoulders resting upon the wooden hub, and tenons passing through the same, felly-plate, and spoke-socket, all constructed and combined substantially as will be hereinafter more fully set forth.

In order to enable others skilled in the art to which my invention appertains to make and use the same, I will now proceed to describe its construction and operation, referring to the annexed drawing which forms a part of this specification, in which—

Figure 1:
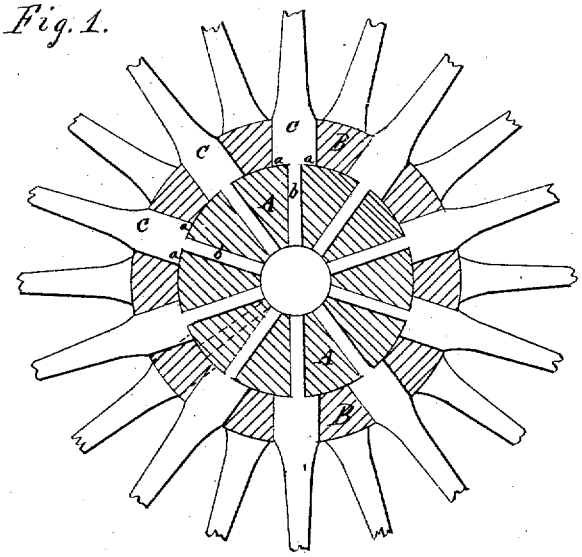
Figure 2:
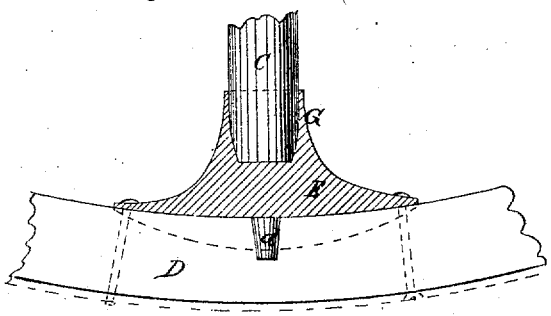
Figure 3:
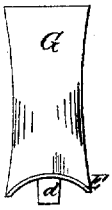
Figure 4:
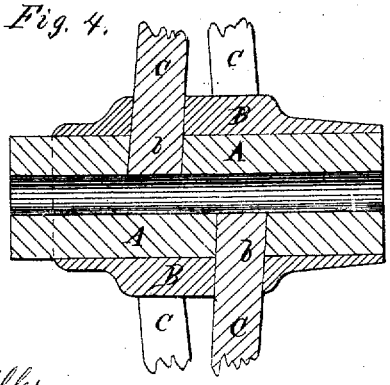

Figure 1 is a transverse vertical section of the hub. Fig. 2 is a view of a portion of the felly, showing the mode of attaching the spoke. Fig. 3 is a side view of the felly-plate and spoke-socket by which the spoke is attached to the felly. Fig. 4 is a longitudinal section of the hub.

A represents the wooden hub, which is driven into the metallic ring B, having two rows of holes or mortises in staggered form, and into which the spokes C C are firmly driven. These holes or mortises in the ring B are of such size that the spokes may be driven in their full size without beveling or cutting off, thus retaining their full strength and lessening their liability of breaking. Each spoke is at its inner end cut with a tenon, *b*, forming a shoulder, *a*, on each side. These shoulders rest upon the face of the wooden hub A, while the tenon *b* passes through the same. By this means the spokes are firmly held in their proper positions. D represents the felly, on the inner side of which is placed the felly-plate E. This plate is concave, to fit the felly with a pin, *d*, projecting from its center into a hole in the felly, as shown. This plate is to be secured to the felly by means of two bolts passing through its extreme ends, said bolts also fastening the tire on the wheel. From the inner side of the felly-plate E projects a socket, G, into which the spoke C is inserted, as shown in Fig. 2, the felly-plate and spoke-socket being made in one piece.

I am aware that staggered-spoke wheels have been made with a metallic ring surrounding the wooden hub and the spokes passing through both. I am also aware that sockets have been made for the insertion of the ends of the spokes, and I do, therefore, not claim such devices broadly as my invention; but What I do claim as new, and desire to secure by Letters Patent, is—

The combinationl in a staggered-spoke wheel, of the hub A, ring B, spokes C C with shoulders *a a* and tenons *b b*, the felly D, and felly-plate E with pin D and spoke-socket G, all constructed and arranged substantially as and for the purposes herein set forth.

In testimony that I claim the foregoing I have hereunto set my hand this 31st day of August, 1871.

JAMES R. BAIRD.

Witnesses:

WILLIAM C. JOHNSON,
GEORGE G. REILY.

(22)